June 2, 1925.

O. C. THOMPSON

MACHINE FOR USE IN MAKING BOXES

Filed April 20, 1920      8 Sheets—Sheet 5

1,539,922

INVENTOR
Osceola C. Thompson
BY Edward Dunne Jr.
ATTORNEY

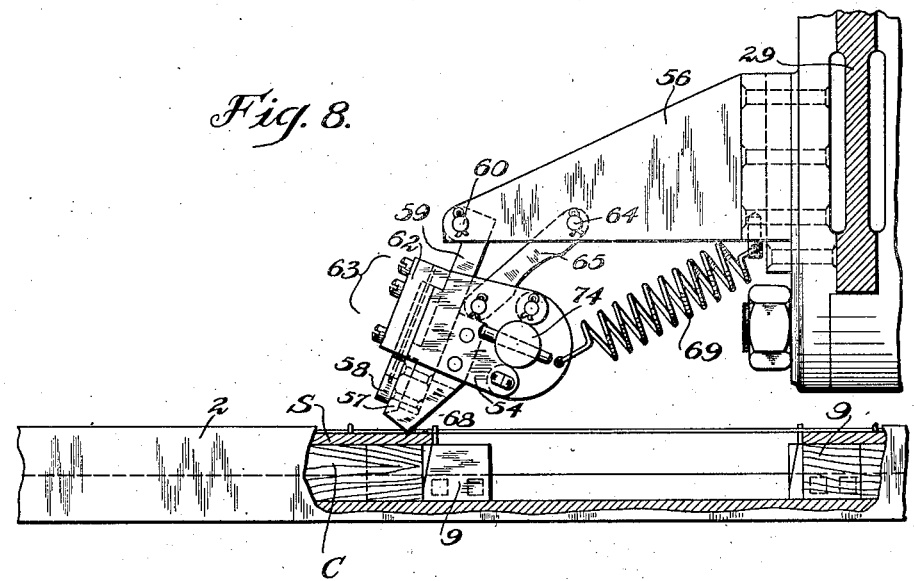
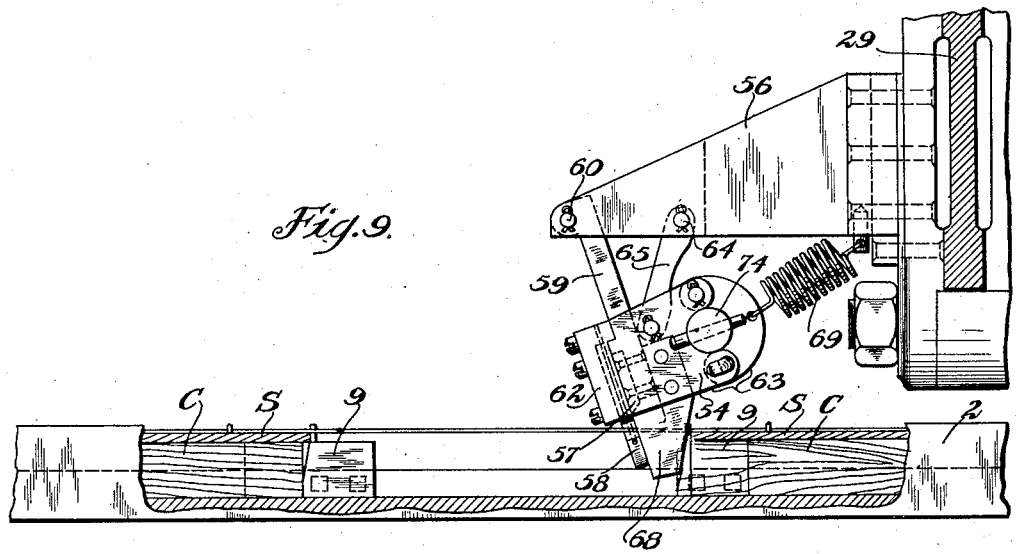

June 2, 1925. 1,539,922
O. C. THOMPSON
MACHINE FOR USE IN MAKING BOXES
Filed April 20, 1920   8 Sheets-Sheet 7
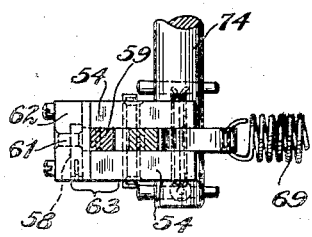
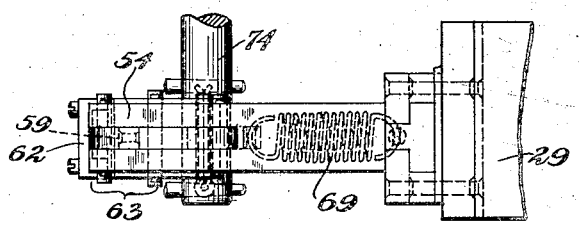
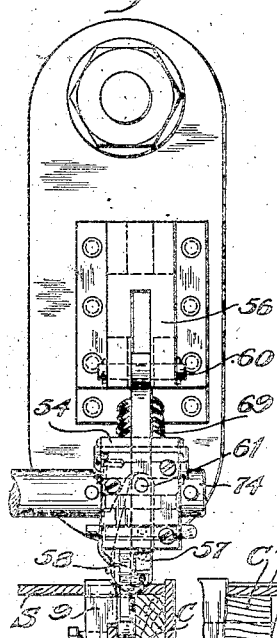
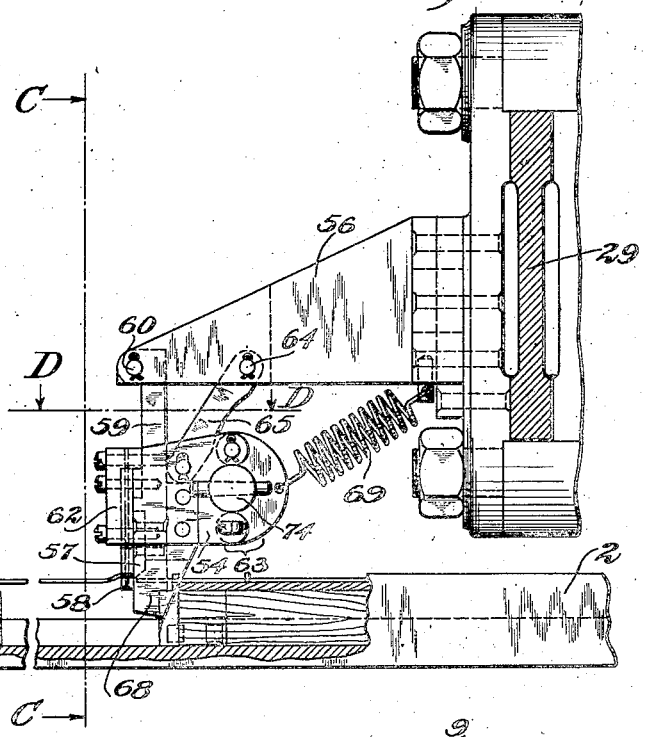
INVENTOR
Osceola C. Thompson
BY
Edward B. Dunn Jr.
ATTORNEY June 2, 1925.

O. C. THOMPSON

MACHINE FOR USE IN MAKING BOXES

Filed April 20, 1920   8 Sheets-Sheet 8

INVENTOR
Osceola C Thompson
BY Edward Dunne Jr.
ATTORNEY

Patented June 2, 1925.

1,539,922

UNITED STATES PATENT OFFICE.

OSCEOLA C. THOMPSON, OF WHITE PLAINS, NEW YORK, ASSIGNOR TO WIREBOUNDS PATENTS COMPANY, A CORPORATION OF MAINE.

MACHINE FOR USE IN MAKING BOXES.

Application filed April 20, 1920. Serial No. 375,195.

*To all whom it may concern:*

Be it known that I, OSCEOLA C. THOMPSON, a citizen of the United States, residing at White Plains, in the county of Westchester, in the State of New York, have invented new and useful Improvements in Machines for Use in Making Boxes, of which the following is a specification.

This invention relates to machines for use in making boxes, crates, box or crate blanks, or parts thereof, and, more particularly, to machines for use in making wirebound boxes, crates, box or crate blanks, and the like.

Among other objects, the invention is intended to provide machines of the class described having improved work-feeding means: to provide such machines with improved wire-severing means, and, generally, to provide improved machines of the class described which may be efficiently and economically operated.

The invention will be best understood by reference to one illustrative embodiment thereof shown in the accompanying drawings, in which.

Figs. 8, 9, and 10 are enlarged side elevations of the wire-severing mechanism during different phases of its operation.

Fig. 11 is a sectional end view from line C—C in Fig. 10;

Fig. 12 is a sectional plan view from line D—D in Fig. 10;

Fig. 13 is a plan view of the wire-severing mechanism shown in Fig. 10;

Fig. 14 is a side elevation of the gauge carried by the wire-severing mechanism;

Fig. 15 is an end elevation of the gauge shown in Fig. 14;

Fig. 16 is a top plan view of the gauge shown in Fig. 14;

Fig. 17 is a perspective view of one form of spacer block used in the illustrative machine;

Figs. 18, 19, 20, and 21 are diagrammatic views of the cutting knives showing the positions of the knives during different phases of a wire-severing operation.

The illustrative machine consists generally of a gang of fastener-setting mechanisms operable to apply binding wire to box parts presented thereto in properly assembled relation by work-forwarding means, and wire-severing mechanism for automatically severing the binding wire between successive work assemblies.

Figure 1:
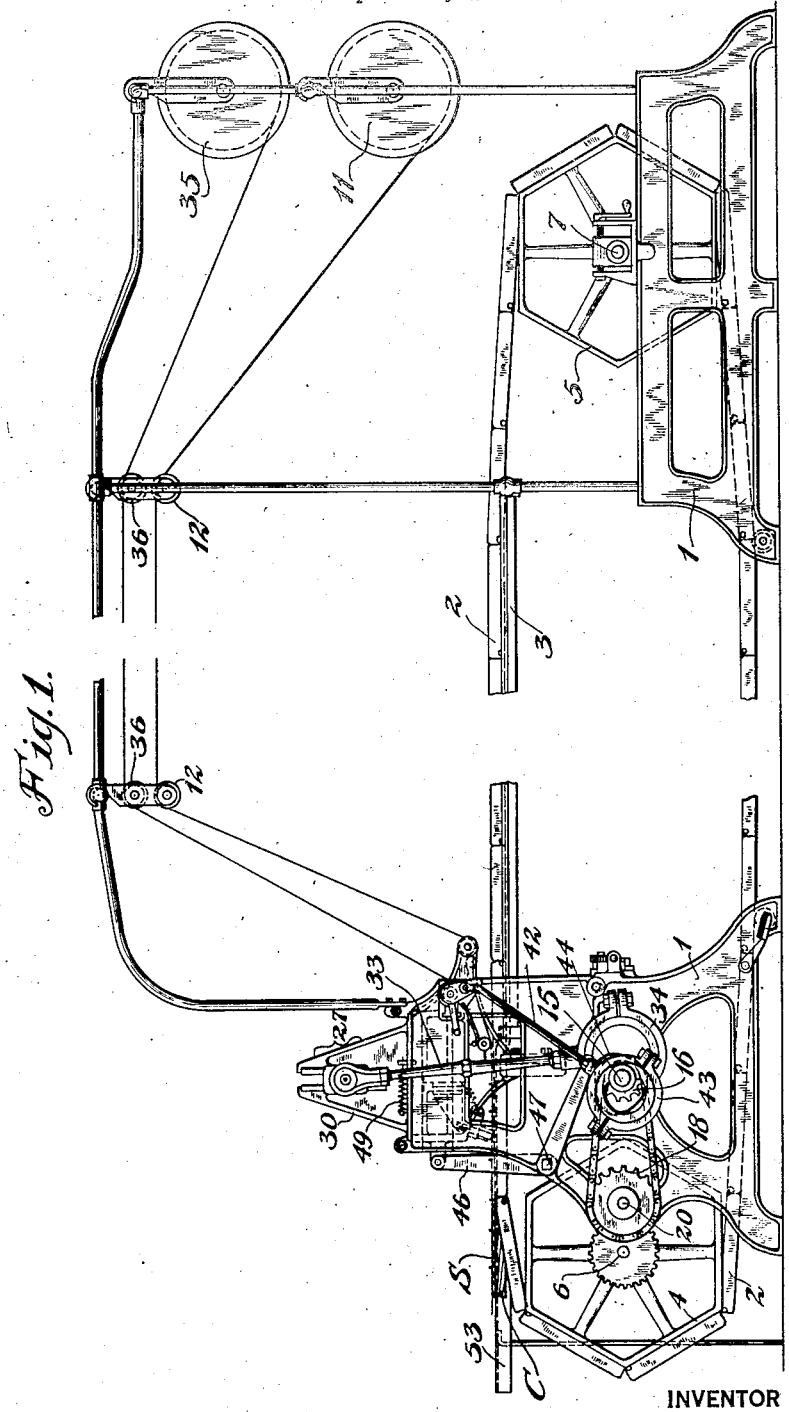
Fig. 1 is a side elevation of a box blank machine embodying the invention.
Figure 2:
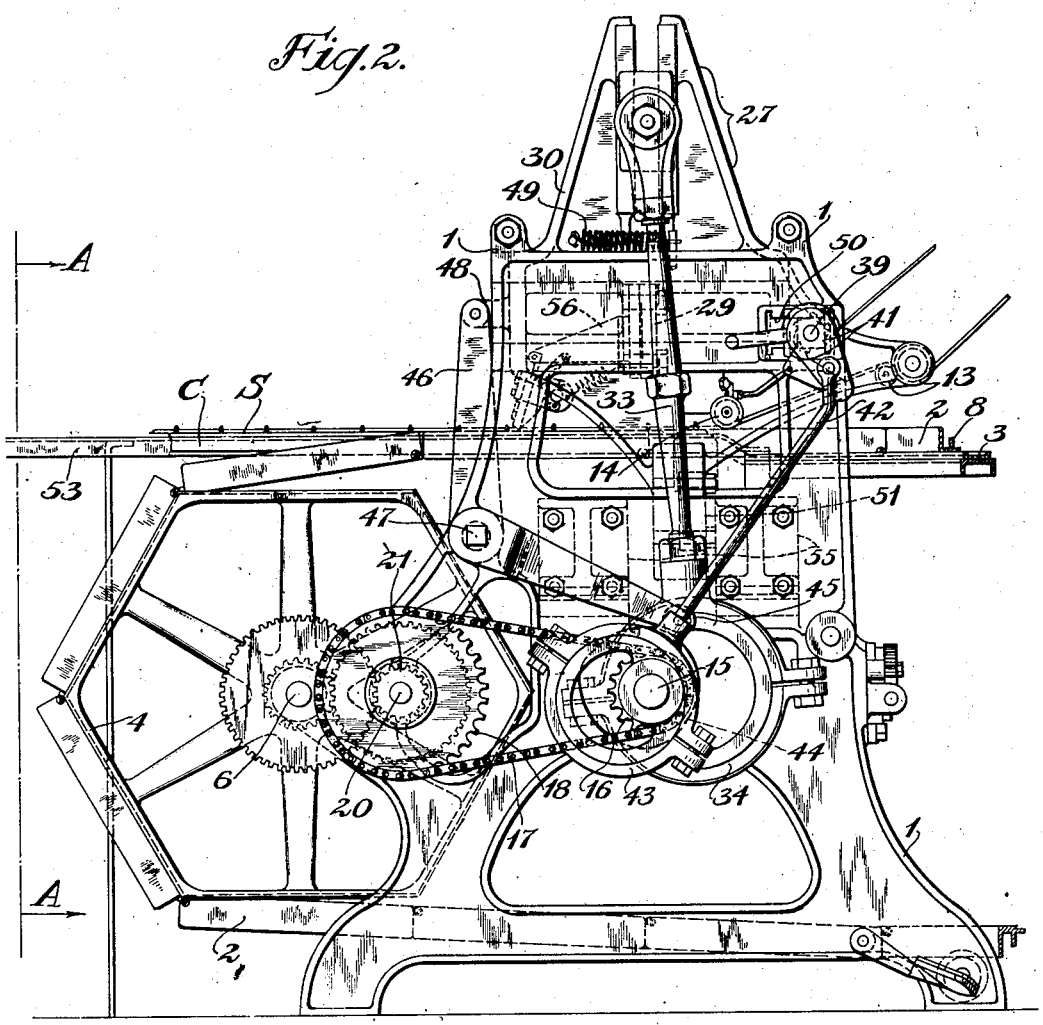
Fig. 2 is an enlarged side elevation of the delivery end of the machine showing the work-feeding, fastener-setting, and wire-severing mechanisms.

In the illustrative machine, the work-forwarding means comprises the endless conveyer chains 2 appropriately formed to receive cleats $c$ and sheets of side material $s$ for box or crate blanks and spacer blocks 9 adjustably secured to flanges 8 for spacing the cleats $c$ and sheets $s$ of adjacent sections of a blank and for spacing successive blanks. As shown in Fig. 1, conveyer chains 2 run in channel guides 3 and pass over driven sprocket wheels 4 on shaft 6 at one end of the machine and over idler sprocket wheels 5 on shaft 7 at the other end of the machine, said shafts 6 and 7 being journaled in suitable bearings in the frames 1 at either side of the machine, which frames are rigidly connected and supported by the cross-frame members 55. The chains 2, comprising individual links, may be adjustable laterally to accommodate different sized boxes, and the shaft 7 may be adjustable toward and from shaft 6 to accommodate the removal or insertion of individual chain links to shorten or lengthen the conveyer chains 2.

Sections of cleats and sheets for a box blank or blanks are assembled in proper spaced relationship on the conveyer chains 2 between spacer blocks 9 and advanced beneath staplers 10 which connect said sections in foldable relationship with binding wires by driving staples or other fastening means over the wires, through the sheets, and into or through the cleats. Additional binding wires are or may be stapled to the sheets alone and the staples clinched on their under sides.

The binding wires, which are carried by suitable supply reels 11 and pass over rollers 12, are fed through rollers 13 on the carriage 27 and thence under rollers 14 at the feet of the stapler bodies and are pulled along by reason of their attachment to the work at preceding points.

In the illustrative machine, the work-forwarding means is advanced continuously by a feed mechanism actuated from the main shaft 15.

Figure 5:
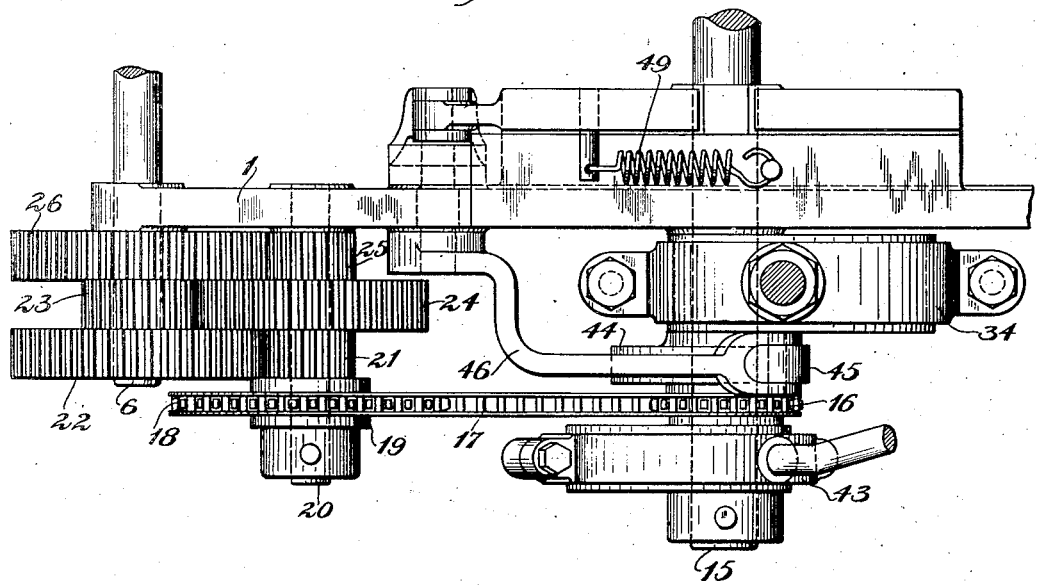
Fig. 5 is an enlarged plan view of one side of the delivery end of the machine showing the main shaft and power-transmission mechanism.
Figure 6:
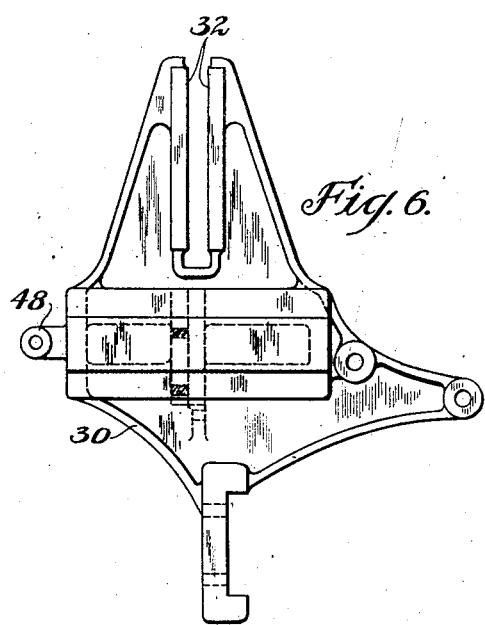
Fig. 6 is an enlarged side elevation of one of the side frames of the fastener-setting mechanism carriage.
Figure 7:
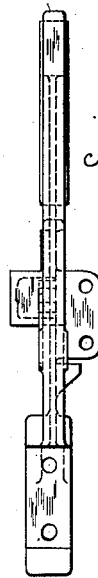
Fig. 7 is an end view of the carriage frame shown in Fig. 6.
Figure 18:
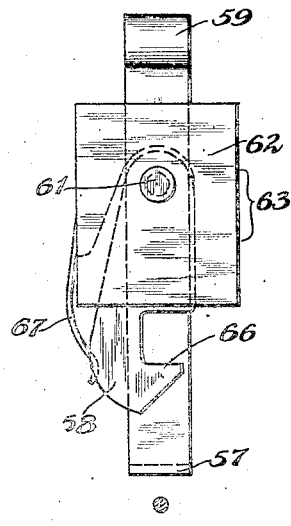

As illustrated, such feed mechanism may comprise the sprocket chain gear and the reduction spur gears shown in Fig. 5 consisting of sprocket wheel 16 keyed to the main shaft 15, sprocket chain 17, sprocket wheel 18 carried by a sleeve 19 on stud 20 suitably fastened to the frame of the machine, and spur gears 21, 22, 23, 24, 25, and 26. It will be noted that spur gear 21 is keyed to the sleeve 19 and that spur gear 26 is keyed to shaft 6 so that movement of the sprocket wheel 18 imparts movement to shaft 6, sprocket wheel 4, and the conveyer chains 2. In the illustrative mechanism shown, the reduction gears are preferably proportioned and arranged to move the conveyer chains approximately two inches per revolution of the main shaft, but it will be understood that the feed mechanism may be proportioned and arranged to produce a longer or shorter movement of the conveyer chains per revolution of the main shaft without departing from the invention.

It has been customary, heretofore, in the manufacture of wirebound box or crate blanks, to feed the materials intermittently beneath stationary staplers which drive staples into the work during the intervals between such intermittent movements and while the work is at rest. In the present invention the box or crate materials are fed continuously and the staples or fasteners are driven into the moving work.

In driving the staples or fasteners into the continuously moving work, it is found desirable to cause the staplers to move with the work during fastener-setting operations and return to initial position after the completion of each such operation. The staplers 10, therefore, in the illustrative machine are carried by the carriage 27 which is reciprocable longitudinally of the work in the guides 28 of the main frames 1.

The staplers 10, which are adapted to form and drive a staple upon each revolution of the main shaft 15, may be of the type disclosed in the re-issued patent to Thompson, No. 15,045 of February 15, 1921, and are mounted on cross-head 29 set in the side frames 30 of the carriage 27 and are operated by the vertically reciprocating cross-head 31 slidably mounted in guides 32 of said side frames 30.

Cross-head 31 is reciprocated vertically through pitman 33 and eccentric 34 on the main shaft, there being similar operating mechanisms at either side of the machine.

Staple wire from which the staples are formed is fed to the staplers 10 from suitable supply reels 35 over rollers 36 and between pairs of feed rollers 37—38 keyed to shafts 39 and 40, respectively, journaled in the side frames 30 of the carriage 27, said feed rollers being operated by a ratchet and pawl mechanism 41 through pitman 42 and eccentric 43 on the main shaft.

As illustrated, the carriage 27 may be moved with the work by means of a cam 44 on the main shaft 15 operating on a roller 45 carried at one end of a bell crank lever 46 pivoted at 47 to the frame of the machine, the other end of which is pivotally secured to a bracket 48 carried by the carriage 27 so that when the roller 45 is raised by the cam 44, the carriage 27 will be advanced with the work.

The cam 44 and the lever 46 are so formed, adjusted and correlated with respect to the operations of the staplers 10 and the work-feeding mechanism that the carriage 27 is preferably advanced synchronously with the work during the lower half of the cycle of operation of the staplers and is free to be returned to initial position by the action of spring 49 during the upper half of the cycle of operation of the staplers.

As heretofore stated, the illustrative machine is designed to move the work-forwarding means approximately two inches per revolution of the main shaft and the staplers are designed to form and drive a staple at each revolution of the main shaft, the staple being formed and driven on the down stroke of the cross-head 31; thus, the staple driving takes place during less than one-half a revolution of the main shaft, during which time the work is moved less than one inch. Thus, carriage 27 carrying the staplers 10 need move only a very short distance with the work during a driving operation and is returned to initial position during the upper half of the cycle of operation of the staplers.

To accommodate the movement of shaft 39 with the carriage 27, a slot 50 is formed in the main frames 1, through which the shaft 39 may extend.

It will be noted that in the illustrative machine the work is moved continuously and preferably at approximately a uniform speed and that staples or fasteners are driven into the moving work at intervals and that the fastener-setting mechanism moves with the work during fastener-setting operations.

It will also be noted that in the illustrative machine the fastener-setting mechanism, during a fastener-setting operation, preferably moves substantially synchronously with the work and in a line parallel to its line of movement and returns along the same line to initial position.

For clinching the staples on the under side of the work, the movable carriage 27 is provided with a crossbar 51 secured to the side frames 30 and extending between said frames directly beneath the staple drivers, to which bar clincher blocks or anvils 52 may be adjustably secured beneath each stapler and upon which the staples may be driven and clinched.

Thus it will be seen that the clincher blocks or anvils which are carried by the fastener-setting mechanism carriage move with the fastener-setting mechanism and the work during fastener-setting operations and return to initial position with the fastener-setting mechanism.

For removing the completed blanks from the work-forwarding means, the machine may be provided with table or stripper bars 53 suitably supported at the delivery end of the machine, upon which bars the blanks may ride after leaving the stapling mechanism and be thereby disengaged from the work-forwarding means.

Before the work is delivered to the table or stripper bars 53, the wires connecting one group of box parts with another may be severed by the automatic cutting mechanism presently to be described.

The binding wires are intended to be severed between one group of box parts and another in such a manner as to leave free wire ends projecting beyond the ends of the box parts which may be joined with similarly projecting wire ends on other box parts. For this purpose, groups of box parts between which wires are to be severed are suitably spaced to leave between them a sufficient length of wire to provide, when severed, the desired free ends. Such spacing may be effected, for example, by placing the first spacer blocks for a group of box parts the desired distance in the rear of the last spacer blocks for the preceding group.

Mechanism for severing the binding wires is arranged at the delivery end of the machine and preferably at such a distance from the fastener-setting mechanism as to insure the driving of a plurality of successive fasteners—three, for instance—in each group of box parts before severing the wires; thus the wires will be firmly held against slipping during and after the severing operation.

The illustrative wire-severing mechanism comprises a gang of individual wire cutters corresponding in number to the staplers 70 and arranged directly behind the staplers in the line of travel of the work. Said cutters are normally maintained in inoperative or inactive position and are adapted, upon presentation of a cutting space between groups of box parts to enter said space and engage and cut the wires.

As shown, the individual cutters are carried by brackets 56 adjustably secured to the cross-bar 29 of the carriage 27 and are adapted to be maintained above the work in non-cutting position until a space between groups of box parts is presented, whereupon the cutters swing into such space for a wire-severing operation. After a wire-severing operation, the cutters are raised and again assume an inoperative position.

In the illustrative machine the cutters ride on the work while they are in inoperative position, but it will be understood that any suitable means for supporting the cutters may be employed without departing from the invention.

An individual cutter consists of the relatively movable knives 57 and 58 pivotally suspended from the bracket 56 and adapted to cooperate and sever a wire therebetween As best shown in Figs. 8, 9, 10, and 11, knife 57 is rigidly secured to the lower end of arm 59 pivotally hung at 60 to the bracket 56; and knife 58 is pivotally hung from a pin 61 carried by the front plate 62 of casing 63 pivotally supported at 64 from the bracket 56 by lever 65. Arm 59, carrying knife 57, passes through an opening in casing 63 between side plates 54 so that casing 63 and knife 58 carried thereby, are free to ride up and down on arm 59. It will be noted that arm 59 is slidably encased by casing 63 and that arm 59 and casing 63, being pivotally hung from different points on the bracket 56, will follow different arcs of travel when pivoted about their respective pivot points. Thus, casing 63, pivoted about point 64 as a center, will ride up or down on arm 59 pivoted about point 60 as a center, depending upon the position of the parts and the direction of pivot, and knife 57 carried by arm 59 will move relatively to knife 58 carried by the casing 63.

Figs. 18, 19, 20, and 21 clearly illustrate the form and operation of the knives 57 and 58. As there shown, swinging knife 58 is beveled at its lower extremity and its cutting edge 66 is formed in an opening or notch in the knife so that, when knife 58 is lowered against a wire to be severed by movement of casing 63, the wire will contact with the beveled end of the knife, force it to one side, and snap in above the cutting edge 66 when the knife is returned to initial position through the action of spring 67 carried by the casing 63. The wire to be severed will then lie above cutting edge 66 of knife 58 and below the cutting edge of knife 57, in position to be severed when knives 57 and 58 cooperate, as hereinafter explained.

When the cutter swings into a space between groups of box parts for a severing operation, it will contact with the first spacer block 9 for the oncoming group of box parts and be positioned thereby for a severing operation.

For positioning the cutter to provide the desired length of free wire ends, it has been found desirable to provide the cutter with a shoe or gauge 68 secured to the casing 63 and appropriately formed to contact with the beveled portion 72 of the oncoming block 9. The length of free wire ends desired may be obtained by utilizing a gauge of appropriate dimensions. Thus it will be noted that the cutter automatically positions itself for a severing operation by contact with the work-forwarding means and that the wire will be severed in such manner as to provide the desired length of free wire end.

For pivoting the knives 57 and 58 to cause a wire-severing operation after the cutter has swung into operative position against a spacer block, relative movement between the pivot points of the knives and the work-forwarding means is effected; that is, relative movement is effected between bracket 56 and the spacer block against which the cutter is held, thus causing casing 63 to slide upward on the arm 59 and consequently causing the cutting edges of knives 57 and 58 to meet and pass, severing the wire therebetween.

Relative movement between the pivot points of the knives and the work-forwarding means may be effected by movement of the work-forwarding means relative to said points or by movement of said points relative to the work-forwarding means or by movement of said points and the work-forwarding means relatively to each other. In the illustrative machine in which the work-forwarding means is advanced continuously and the cutters reciprocate longitudinally of the work, relative movement between the bracket 56 and the work-forwarding means occurs when the carriage 27 is returned to initial position after a staple driving operation; that is, when the bracket 56 and the work-forwarding means are moving in opposite directions.

During the relative movement of the bracket 56 and the work-forwarding means, the cutter is yieldingly held against the forward block 9 for the oncoming group of box parts by spring 69 so that movement of the work-forwarding means relative to the movement of the bracket 56 and the pivot points of the cutter knives will cause the arm 59 and casing 63 to pivot about their respective pivot points, thus causing relative movement of the knives 57 and 58.

Thus it will be noted that the cutter is automatically actuated by the relative movement between the work-forwarding means and the cutter support. This is particularly advantageous in that it eliminates the necessity of providing an independent actuating mechanism for said cutter and controlling means therefor to govern or time the operation thereof.

Figure 19:
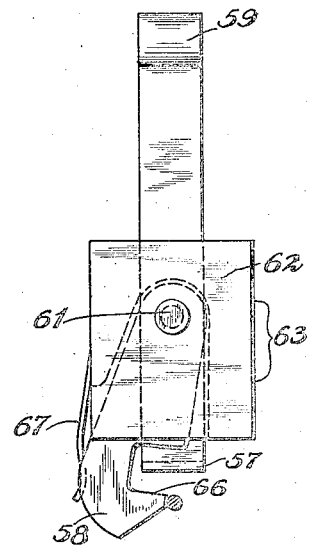
Figure 20:
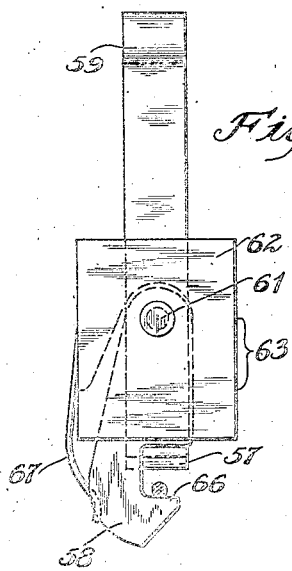
Figure 21:
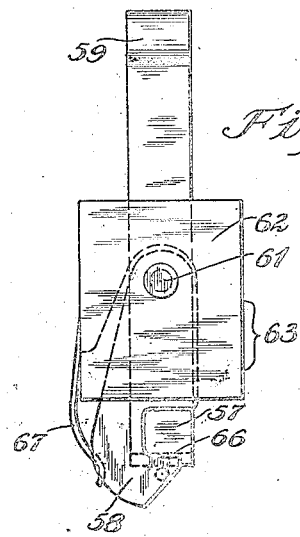

The operation of a cutter is clearly illustrated in Figs. 8 to 11, and 18 to 21, inclusive. In Fig. 8 the cutter is shown in inoperative position and in this position of the cutter, the knives are in the position shown in Fig. 18. As a space between groups of box parts presents itself, the cutter swings into operative position to be engaged by the oncoming block 9, as shown in Fig. 9. During this operation the wire has forced swinging knife 58 to one side, as shown in Fig. 19, and the cutting edge 66 of knife 58 has passed under the wire, as shown in Fig. 20. As soon as the gauge 68 contacts with the block 9, the cutter starts to pivot to the left from the position shown in Fig. 9. Immediately relative movement of knives 57 and 58 takes place; that is, knife 57, following the arc of movement of arm 59, moves downward relative to the movement of knife 58 which, following the arc of movement of casing 63, moves upward relatively to the movement of knife 57. Continued pivoting of the cutter causes the cutting edges of knives 57 and 58 to meet and pass, as shown in Fig. 21, severing the wire therebetween. In the illustrative machine, the cutting takes place when the arm 59 is approximately vertical, as shown in Fig. 10. One advantage of this arrangement is that the wire is severed in approximately its normal plane without being lifted above said plane to any considerable extent by the pivoting of the cutter. As the work-forwarding means continues to move after a cutting operation, the cutter rides up on the block 9 and assumes an inoperative position until the next space between groups of box parts is presented.

It will be noted that the individual cutter hereinabove described is one of the outside cutters which is carried directly above the line of travel of the spacer blocks 9 and the cleats of the box blanks and which will contact with the first spacer block 9 for the oncoming group of box parts when it swings into operative position between two groups of box parts.

The inside individual cutters are similar to the outside cutters except that when the shoe or gauge 68 is used to determine the desired length of free wire ends, such shoe or gauge need not be secured to the inside cutters.

For positioning and operating the inside cutters, a shaft 74 is passed through the casings 63 of the several cutters, thus maintaining all the cutters in the same relative position at all times and causing approximately a uniform operation thereof when the outside cutters are actuated by the relative movement of the work-forwarding means and the cutter supports. Thus it will be seen that a plurality of cutters are provided which may be positioned and actuated by the work-forwarding means to sever a plurality of wires in such a manner as to provide the desired free wire ends.

It will also be noted that when the cutters are in an inoperative position the outside cutters are directly over the cleats, which will prevent the cutters from swinging into spaces between slats when a crate blank is being operated upon.

It will be understood that the wire-severing mechanism illustrated herein is adapted for use with different types of wirebound box blank machines, such, for example, as machines of the intermittent-feed type, in which the work is fed step by step beneath stationary staplers.

Figure 3:
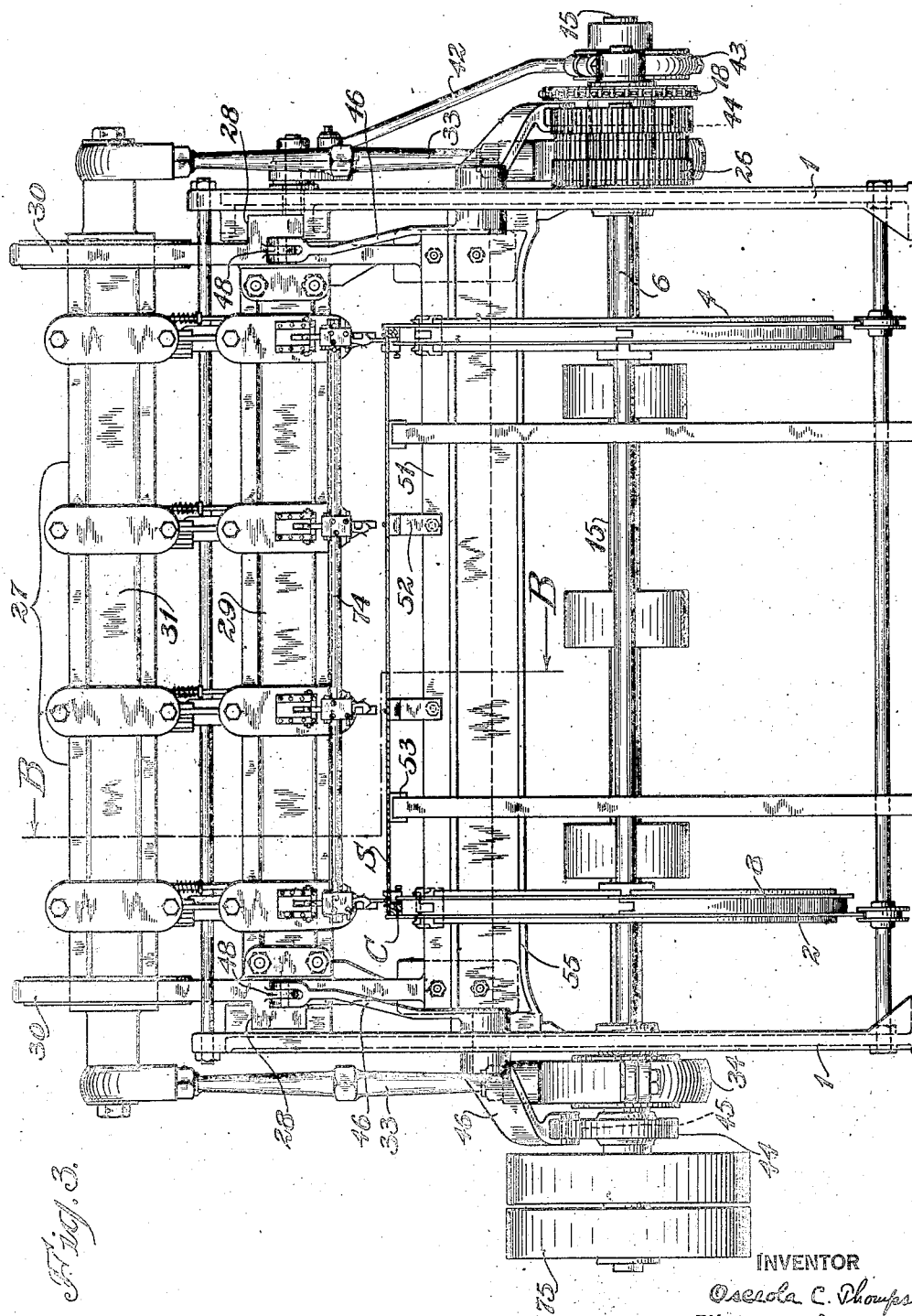
Fig. 3 is an end elevation viewed from the line A—A of Fig. 2.
Figure 4:
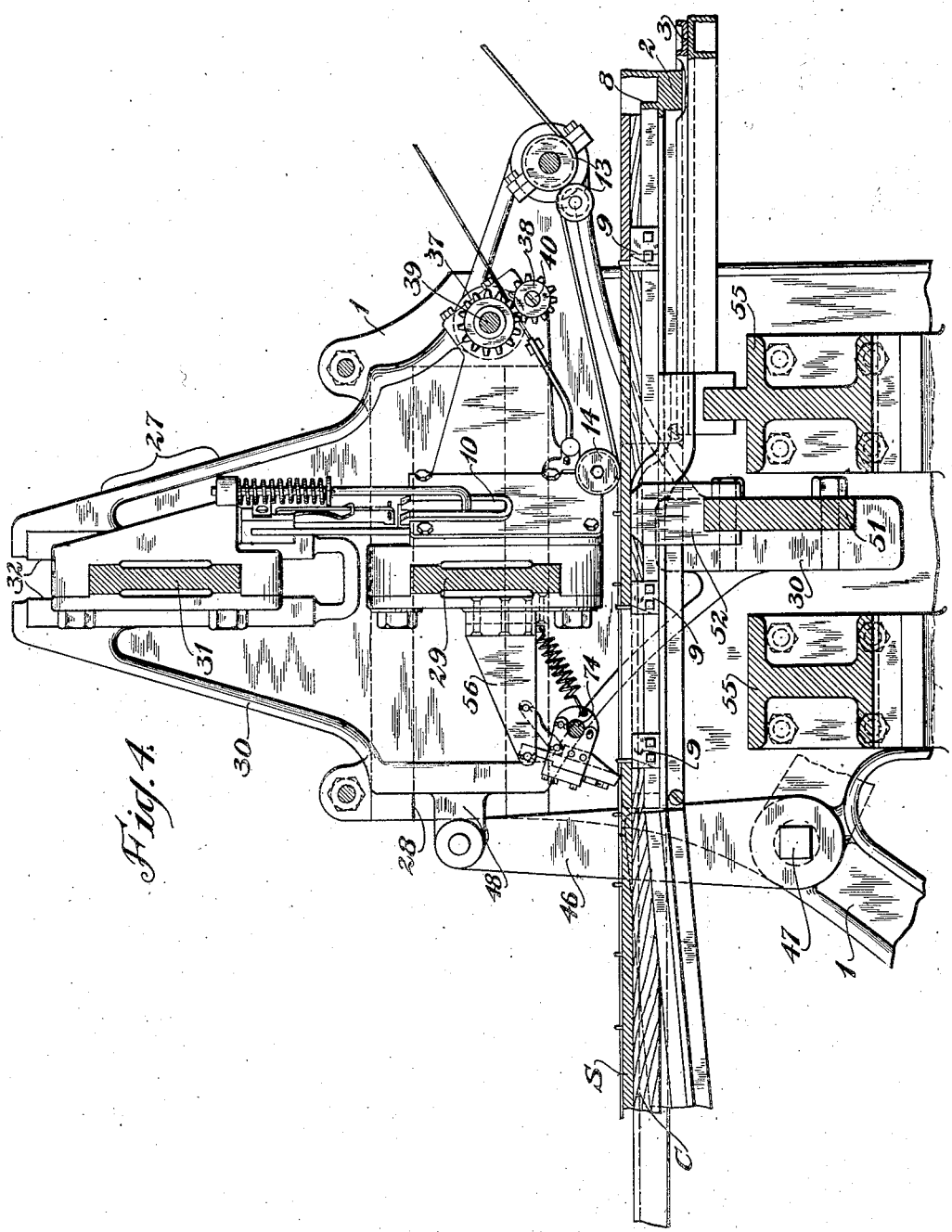
Fig. 4 is an enlarged sectional view of the fastener-setting and clinching mechanism taken on the line B—B of Fig. 3.

Power for operating the machine may be applied in any suitable manner as, for instance, by power pulley 75 shown in Fig. 3, which may be controllably clutched to the shaft 15 by any suitable clutch mechanism.

It will be understood that the expressions "continuous", "continuously", and the like, as used in the specification and claims in connection with the movement, progression, or feed of the work or work-forwarding means, is intended to distinguish from an intermittent or step-by-step movement, progression, or feed, and is intended to include any uninterrupted movement, progression, or feed of the work or work-forwarding means during which the staplers operate upon the moving work.

Obviously, the present invention is not limited to the particular embodiment shown and described, but may be variously embodied, and the particular construction shown may be variously modified, as will appear to those skilled in the art. Furthermore, it is not indispensable that all the features of the invention be used conjointly, since they may be used to advantage in various different combinations and subcombinations.

Having described the invention, what is claimed is:

1. A machine for use in making boxes comprising, in combination, means for spacing box parts; fastener-setting mechanism operable upon moving box parts; and means for causing relative progression between said mechanism and the box parts; said machine being adapted to operate without interruption upon materials for a plurality of boxes.

2. A machine for use in making wirebound boxes comprising, in combination, a work support; work-feeding means; and binding-wire-applying means including fastener-setting mechanism movable parallel to the movement of the work during fastener-setting operations.

3. A machine for use in making wirebound boxes comprising, in combination, a work support; work-feeding means; and binding-wire-applying means including fastener-setting mechanism reciprocable longitudinally of the work; said machine being adapted to operate without interruption upon a plurality of work assemblies.

4. A machine for use in making wirebound boxes comprising, in combination, means to position and feed a succession of box assemblies; and binding-wire-applying means including fastener-setting mechanism movable with the work during fastener-setting operations; said machine being adapted to operate without interruption upon a plurality of box assemblies.

5. A machine for use in making boxes comprising, in combination, work-positioning means for spacing box parts; work-feeding means; and fastener-setting mechanism movable synchronously with the work during fastener-setting operations; said machine being adapted to operate without interruption upon a succession of work assemblies.

6. A machine for use in making boxes comprising, in combination, fastener-setting mechanism operable to drive fasteners when moving with the work; means to feed the work; and means to move said mechanism with the work at intervals; said elements constituting an organization adapted for uninterrupted operation upon a succession of box assemblies.

7. A machine for use in making boxes comprising, in combination, a work support; fastener-setting mechanism operable upon moving work; and means for feeding the work continuously to said mechanism; said elements constituting an organization adapted for uninterrupted operation upon a succession of box assemblies.

8. A machine for use in making boxes comprising, in combination, a work support; means for feeding the work continuously; fastener-setting mechanism operable upon movement with the work; and means to move said mechanism with the work; said elements constituting an organization adapted for uninterrupted operation upon a succession of box assemblies.

9. A machine for use in making boxes comprising, in combination, a work support; work-feeding means; and fastener-setting mechanism movable with the work; said elements constituting an organization adapted for uninterrupted operation upon a succession of box assemblies.

10. A machine for use in making boxes comprising, in combination, a work support; work-feeding means; and fastener-setting mechanism movable with the work during a fastener-setting operation and returnable in the opposite direction to initial position; said elements constituting an organization adapted for uninterrupted operation upon a succession of box assemblies.

11. A machine for use in making boxes comprising, in combination, a work support; work-feeding means; and fastener-setting mechanism movable synchronously with the work during fastener-setting operations; said elements constituting an organization adapted for uninterrupted operation upon a succession of box assemblies.

12. A machine for use in making boxes comprising, in combination, endless work-forwarding means adapted to position in spaced relationship a plurality of box parts; means for feeding the work continuously; fastener-setting mechanism for driving fasteners into the work; a carriage for said fastener-setting mechanism; and means to move said carriage with the work during fastener-setting operations; said machine being adapted to operate without interruption upon a succession of work assemblies.

13. A machine for use in making boxes comprising, in combination, endless work-forwarding means adapted to position in spaced relationship a plurality of box parts; means for feeding the work continuously at approximately a uniform speed; fastener-setting mechanism for driving fasteners into the work; a carriage for said fastener-setting mechanism; and means to move said carriage parallel to the movement of the work during fastener-setting operations.

14. A machine for use in making boxes comprising, in combination, endless work-forwarding means adapted to position in spaced relationship a plurality of box parts; means for feeding the work continuously; fastener-setting mechanism for driving fasteners into the work; a carriage for said fastener-setting mechanism; means to move said carriage with the work during fastener-setting operations and to return it to original position after the fastener-setting operation; said machine being adapted to operate without interruption upon a succession of work assemblies.

15. A machine for use in making boxes comprising, in combination, work-positioning means for spacing box parts; means to feed the box parts continuously; and fastener-setting mechanism including means to clinch the fasteners operable upon the moving work; said machine being adapted to operate without interruption upon materials for a plurality of boxes.

16. A machine for use in making boxes comprising, in combination, work-positioning means for spacing box parts; means to feed the box parts continuously; and fastener-setting mechanism including means to clinch the fasteners movable parallel with the work during fastener-setting operations.

17. A machine for use in making wire-bound boxes comprising, in combination, means for spacing and forwarding box parts; mechanism to apply binding wire to the box parts; and wire-severing means adapted to ride on the box parts, enter spaces between box parts, and be actuated by the work-forwarding means.

18. A machine for use in making wire-bound boxes comprising, in combination, means for spacing and forwarding box parts; mechanism to apply binding wire to the box parts; and oscillating wire-severing mechanism directly actuated by the work-forwarding means.

19. A machine for use in making wire-bound boxes comprising, in combination, means for spacing and forwarding box parts; mechanism to apply binding wire to the box parts; and wire-severing means comprising a pair of relatively movable cutting members directly actuated by the work-forwarding means.

20. A machine for use in making wire-bound boxes comprising, in combination, means for spacing and forwarding box parts; mechanism to apply binding wire to the box parts; and wire-severing means adapted to be oscillated by the work-forwarding means, comprising a pair of cutting members relatively movable upon oscillation of said severing means.

21. A machine for use in making wire-bound boxes comprising, in combination, means for spacing and forwarding box parts; mechanism to apply binding wire to the box parts; and wire-severing means adapted to be directly engaged and moved by the work-forwarding means, comprising a pair of relatively movable cutting members operable by movement with the work-forwarding means.

22. A machine for use in making wire-bound boxes comprising, in combination, means for spacing and forwarding box parts; mechanism to apply binding wire to the box parts; and wire-severing means adapted to be directly engaged and moved by the work-forwarding means, comprising a plurality of pairs of relatively movable wire-cutting members operable by movement with the work-forwarding means.

23. A machine for use in making wirebound boxes comprising, in combination, means for spacing and forwarding box parts; mechanism to apply binding wire to the box parts; and a plurality of wire-severing mechanisms adapted to ride on the box parts, enter spaces between box parts and be actuated by the work-forwarding means.

24. A machine for use in making wire-bound boxes comprising, in combination, means for spacing and forwarding box parts; mechanism to apply binding wire to the box parts; and wire-severing means adapted to engage the work-forwarding means and operable upon movement therewith.

25. A machine for use in making wire-bound boxes comprising, in combination, means for spacing and forwarding box parts; mechanism to apply binding wire to the box parts; and pivotally supported wire-severing means adapted to engage the work-forwarding means and operable upon movement of its support relative to the work-forwarding means.

26. A machine for use in making wire-bound boxes comprising, in combination, means for spacing and forwarding box parts; mechanism to apply binding wire to the box parts; and wire-severing means adapted to engage the work-forwarding means comprising a pair of relatively movable cutting members pivotally suspended from different points on a movable support and adapted to cooperate upon relative movement of the work-forwarding means and said support.

27. A machine for use in making wire-bound boxes comprising, in combination, means for spacing and forwarding box parts; mechanism to apply binding wire to the box parts; and wire-severing means adapted to engage the work-forwarding means comprising a pair of relatively movable cutting members pivotally suspended from different points on a movable support and adapted to cooperate upon movement of said support relative to the work-forwarding means.

28. A machine for use in making wire-bound boxes comprising, in combination, work-forwarding means; means to secure binding wire to box parts; and wire-severing means directly actuated by the work-forwarding means, including a gauge for positioning said severing means for a cutting operation.

29. A machine for use in making wire-bound boxes comprising, in combination, work-forwarding means; means to secure binding wire to box parts; and wire-severing means directly actuated by the work-forwarding means, including a gauge for positioning said severing means for a cutting operation relative to a box edge.

30. A machine for use in making wire-bound boxes comprising, in combination, work-forwarding means; means to secure binding wire to box parts; and wire-severing means directly actuated by the work-forwarding means, including a gauge adapted to successively position said severing means for a cutting operation relative to edges of each of successive work assemblies.

31. A machine for use in making wire-bound boxes comprising, in combination, a work support; means for feeding the work continuously; mechanism for applying binding wire to the moving work; and means operable upon the moving work for severing the binding wire between successive work assemblies.

32. A machine for use in making wire-bound boxes comprising, in combination, means for spacing box parts; mechanism for applying binding wire to moving box parts; means for feeding the box parts continuously to said mechanism; and means for automatically severing the wire between box parts without stopping the machine.

33. A machine for use in making wire-bound boxes, comprising, in combination, work-positioning means for spacing box parts; feeding means for causing continuous movement of the box parts; mechanism for applying binding wire to the moving work; and means for automatically severing the wire between box parts while the same are moving.

34. A machine for use in making wire-bound boxes comprising, in combination, work-positioning means for spacing a succession of box blanks; feeding means for causing continuous movement of the box blanks; fastener-setting mechanism for applying binding wire to the moving blanks; and means for automatically severing the binding wire between the moving blanks.

35. A machine for use in making wire-bound boxes comprising, in combination, work-positioning means for spacing box parts; work-feeding means; and fastener-setting and binding-wire-severing mechanisms movable with the work.

36. A machine for use in making wire-bound boxes comprising, in combination, a work support; work-feeding means; binding-wire-applying mechanism movable with the work; and means operable upon the moving work for automatically severing the binding wire between work assemblies.

37. A machine for use in making wire-bound boxes comprising, in combination, endless work-forwarding means; means for feeding the work continuously at approximately uniform speed; mechanism for applying binding wire to the work; means for automatically severing the binding wire between work assemblies; a carriage for said binding-wire-applying and severing mechanisms; and means to move said carriage with the work during a binding-wire-applying operation and to return it to original position after such operation.

38. A machine for use in making boxes comprising, in combination, work-forwarding means; binding wire-applying mechanism; and a plurality of wire-severing mechanisms normally held in inoperative position but adapted upon presentation of a space between box parts to first enter said space and then be actuated by the work-forwarding means.

39. A machine for use in making wire bound boxes comprising, in combination, means for causing continuous movement of the box parts; means for applying binding wire to the moving box parts; and wire-severing means operable upon the moving work for severing the binding wire between box parts.

40. A machine for use in making wire bound boxes comprising, in combination, means for causing continuous movement of the work; a carriage reciprocable longitudinally of the work; binding-wire-applying mechanism carried by said carriage and operable while the carriage is moving with the work; and binding-wire-severing means carried by said carriage and operable while the carriage is moving oppositely to the movement of the work.

41. A machine for use in making boxes comprising, in combination, work-positioning means; work-feeding means; and binding-wire-applying mechanism adapted to apply binding wire to moving box parts; said machine being adapted to operate without interruption on materials for a plurality of boxes.

42. A machine for use in making boxes comprising, in combination, a work support; means to feed the work continuously; and binding-wire-applying mechanism including means adapted to form a staple and drive it over binding wire into the moving work; said machine being adapted to operate without interruption on a plurality of work assemblies.

43. A machine for use in making boxes comprising, in combination, a work support; means to feed the work continuously; and binding-wire-applying mechanism movable parallel with the work during applying operations and adapted to form a staple and drive it over the binding wire into the moving work.

44. A machine for use in making boxes comprising, in combination, box part feeding means; binding-wire-guiding means; and fastener-setting mechanism including staple forming and driving mechanism adapted to form a staple and drive it over the binding wire into the moving work; said machine being adapted to operate without interruption upon a succession of box assemblies.

45. A machine for use in making boxes comprising, in combination, box part feeding means; binding-wire-guiding means movable with the work; and fastener-setting mechanism including staple forming and driving mechanism adapted to form a staple and drive it over the binding wire into the moving work; said machine being adapted to operate without interruption upon a succession of work assemblies.

46. A machine for use in making boxes comprising, in combination, box part feeding means; binding-wire-guiding means; and fastener-setting mechanism movable parallel with the work including staple forming and driving mechanism adapted to form a staple and drive it over the binding wire into the moving work.

47. A machine for use in making boxes comprising, in combination, means to feed box parts continuously; and binding-wire-applying mechanism movable with the box parts during wire applying operations including means to guide the binding wire to position on the box parts, means to form a staple and present it in driving position, and means to drive the staple over the binding wire into the moving box parts; said machine being adapted to operate without interruption upon a succession of box assemblies.

48. A machine for use in making boxes comprising, in combination, means to feed box parts continuously; and binding-wire-applying mechanism movable parallel with the box parts during wire applying operations including means to guide the binding wire to position on the box parts, means to form a staple and present it in driving position, and means to drive the staple over the binding wire into the box parts.

49. A machine for use in making boxes comprising, in combination, means to feed box parts; and binding-wire-applying mechanism operable upon the moving box parts including binding-wire-guiding means and fastener-setting mechanism; said machine being adapted to operate without interruption upon a succession of box assemblies.

50. A machine for use in making boxes comprising, in combination, means to feed box parts continuously; and binding-wire-applying mechanism movable with the box parts during wire applying operations including binding-wire-guiding means and fastener-setting mechanism; said machine being adapted to operate without interruption upon a succession of box assemblies.

51. A machine for use in making boxes comprising, in combination, means to feed box parts continuously; and binding-wire-applying mechanism operable upon the moving box parts including binding-wire-guiding means to position the binding wire on the box parts, means to form a staple from staple wire fed thereto and to present said staple in driving position, and means to drive the staple over the binding wire into the box parts; said machine being adapted to operate without interruption on a succession of box assemblies.

52. A machine for use in making boxes comprising, in combination, means to feed box parts continuously; and binding-wire-applying mechanism reciprocable longitudinally of the movement of the box parts including binding-wire-guiding means and means to form a staple and drive it over the binding wire into the moving box parts; said machine being adapted to operate without interruption upon a succession of box assemblies.

53. A machine for use in making wire bound boxes comprising, in combination, means to feed box sides and binding wire continuously; means to position the moving binding wire on the moving box parts; and means to fasten the moving binding wire to the moving box parts; said machine being adapted to operate without interruption on a succession of box assemblies.

54. A machine for use in making wire bound boxes comprising, in combination, means for feeding box sides and binding wire continuously; binding-wire-guiding means adapted to move with the wire for a portion of its travel and to move oppositely to the movement of the wire during another portion of its travel; and means to fasten the binding wire to the box sides including staple forming and driving mechanism movable in a path parallel with the movement of the box sides and binding wire during fastener-setting operations.

55. A machine for use in making boxes comprising, in combination, work-feeding means; and binding-wire-applying mechanism having a rectilinear reciprocating movement.

56. A machine for use in making boxes comprising, in combination, work-feeding means; and binding-wire-applying mechanism having a rectilinear reciprocating movement acting in unison with the movement of the work.

57. A machine for use in making boxes comprising, in combination, means to feed box parts continuously; and mechanism for applying binding wire to the moving box parts, said mechanism having a rectilinear reciprocating movement.

58. A machine for use in making boxes comprising, in combination, means to feed box parts continuously; and mechanism for applying binding wire to the moving box parts, said mechanism having a rectilinear reciprocating movement and including binding-wire-guiding means.

59. A machine for use in making boxes comprising, in combination, means to feed box parts continuously; mechanism for applying binding wire to the moving box parts, said mechanism having a rectilinear reciprocating movement; and wire-severing means operable upon the moving work.

60. A machine for use in making boxes comprising, in combination, means to feed box parts and binding wire continuously; and mechanism for fastening the moving binding wire to the moving box parts, said mechanism having a rectilinear reciprocating movement.

61. A machine for use in making boxes comprising, in combination, means to feed box parts and binding wire continuously; and mechanism for fastening the moving binding wire to the moving box parts, said mechanism having a rectilinear reciprocating movement and including means to guide the binding wire on the box parts.

62. A machine for use in making boxes comprising, in combination, means to feed box parts and binding wire continuously; and mechanism for fastening the moving binding wire to the moving box parts, said mechanism having a rectilinear reciprocating movement and including means to guide the binding wire on the box parts, means to form a staple and present it in position for driving and means to drive the staple over the binding wire into the box parts.

63. A machine for use in making boxes comprising, in combination, means to position in spaced relationship and feed a plurality of box parts; and fastener-setting mechanism movable parallel with the movement of the box parts during fastener-setting operations.

64. A machine for use in making boxes comprising, in combination, means to position in spaced relationship and feed a plurality of box parts; and fastener-setting mechanism reciprocable longitudinally of the box parts; said machine being adapted to operate without interruption upon a plurality of box assemblies.

65. A machine for use in making boxes comprising, in combination, work-feeding means and fastener-setting mechanism adapted to drive fasteners into moving box parts; said machine being adapted to operate without interruption upon a plurality of box assemblies.

66. A machine for use in making boxes comprising, in combination, means to feed box parts continuously; and binding-wire-applying means including fastener-setting mechanism movable with the box parts during wire-applying operations; said machine being adapted to operate without interruption upon a succession of box assemblies.

67. A machine for use in making boxes comprising, in combination, a work-support; means to feed the work continuously; and binding-wire-applying mechanism operable upon the moving work; said machine being adapted to operate without interruption upon a plurality of work assemblies.

68. A machine for use in making wirebound boxes comprising means to position and feed box parts; fastener-setting mechanism operable upon moving box parts to apply binding wire thereto; and binding-wire-severing mechanism movable with the box parts during a severing operation.

69. A machine for use in making wirebound boxes comprising means to position and feed box parts; and binding-wire-applying and severing mechanisms operable upon moving box parts.

70. A machine for use in making wirebound boxes comprising means to position and feed box parts; fastener-setting mechanism movable with the box parts to apply binding wire thereto; and means to sever the wire between box parts; said machine being adapted to operate without interruption upon a plurality of box assemblies.

71. A machine for use in making wirebound boxes comprising means to position and feed box parts; fastener-setting mechanism movable parallel to the movement of the box parts to apply binding wire thereto; and means to sever the wire between box parts.

72. A machine for use in making wirebound boxes comprising means to position and feed box parts; fastener-setting mechanism operable upon moving box parts to apply binding wire thereto; and means to sever the binding wire between box parts; said machine being adapted to operate without interruption upon a plurality of box assemblies.

73. A machine for use in making wirebound boxes comprising means to feed box parts continuously; means to apply binding wire to the continuously moving box parts; and means movable with the box parts to sever the binding wire between box parts.

74. A machine for use in making wirebound boxes comprising means to feed box parts continuously at approximately a uniform speed; fastener-setting mechanism movable with the box parts to apply binding wire thereto; and means to sever the binding wire between box parts; said machine being adapted to operate without interruption upon a plurality of box assemblies.

75. A machine for use in making wirebound boxes comprising means to feed box parts continuously at approximately a uniform speed; fastener-setting mechanism movable parallel with the movement of the box parts to apply binding wire thereto; and means to sever the binding wire between box parts.

76. A machine for use in making boxes comprising, in combination, means to position and feed box parts continuously; and fastener-setting mechanism including means to clinch the fasteners movable parallel with the movement of the work during fastener-setting operations.

77. A machine for use in making boxes comprising, in combination, means to position and feed box parts continuously; and fastener-setting mechanism including means to clinch the fasteners operable upon the moving work; said machine being adapted to operate without interruption upon a plurality of box assemblies.

In testimony whereof, I have signed my name to this specification.

OSCEOLA C. THOMPSON.